United States Patent Office 2,990,486
Patented June 27, 1961

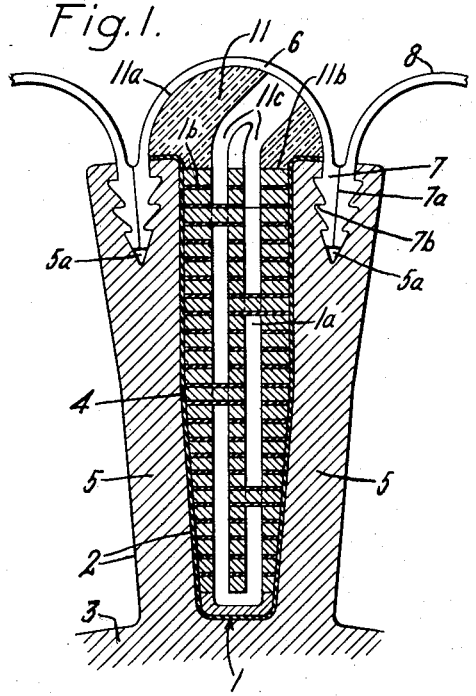
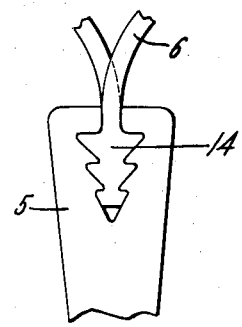
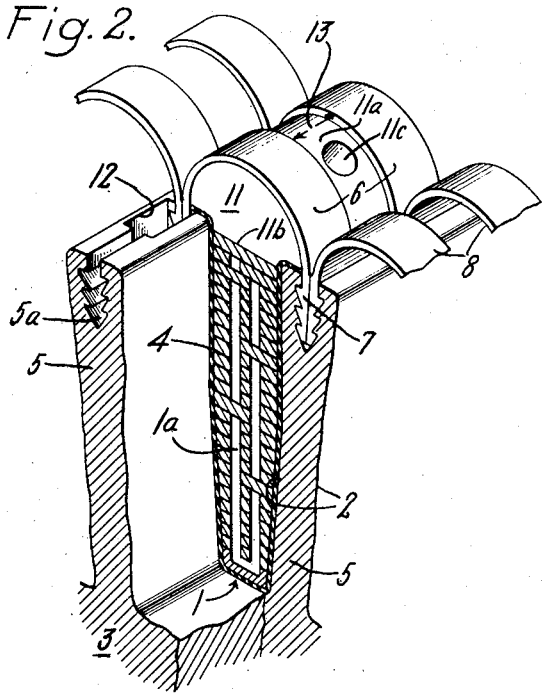
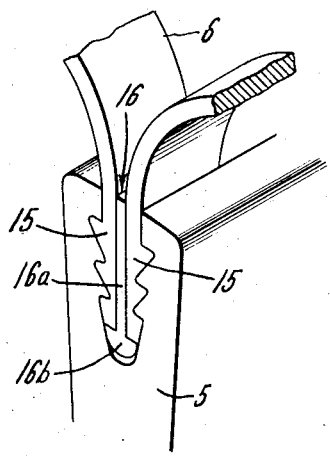

2,990,486
ROTOR COIL SUPPORT SYSTEM FOR
DYNAMOELECTRIC MACHINE
David M. Willyoung, Scotia, N.Y., assignor to General Electric Company, a corporation of New York
Filed Sept. 2, 1959, Ser. No. 837,666
9 Claims. (Cl. 310—214)

This invention relates to a rotor coil support construction and more particularly to an improved arrangement for retaining the windings in the longitudinal slots of a dynamoelectric machine rotor.

The conventional method for retaining the windings on a rotor of the type where the windings are contained in longitudinally extending slots cut in the rotor body is through the use of "slot wedges." As is well known to those skilled in the art, the sides of the winding slots are typically furnished with a dovetail groove designed to accommodate an axially inserted wedge. Due to the extreme force exerted centrifugally by the spinning rotor, the radial depth of the wedges must be relatively great in order to sustain the load. For example, the "coil load" on a 40 inch diameter rotor turning at 3600 r.p.m. would be in the neighborhood of 10,000 pounds per linear inch for each slot. Since the wedges are supported at opposite sides of the slot, the loading pattern is similar to a distributed load on a beam fixed at both ends, and it will be appreciated by those skilled in the art that a bending moment is thus imposed on the wedge.

If it is desired to use "direct-cooled" conductors where a portion of the coolant is introduced from the "air gap" between rotor and stator, the wedges are often furnished with holes to feed the coolant and to discharge it. These holes cause stress concentrations and reduce the strength of the wedges.

Likewise, since the wedge must be anchored in grooves cut in opposite sides of the slot, the space occupied by the wedge and the grooves is wasted, since if it were not for the presence of the wedge, this space could be gainfully used to hold additional conductor strands. For example, on a typical design for a large turbine-generator, the present coil wedge cross-section area is nearly 40% of the active winding area. Modifications of the rotor coil supporting system which would allow a portion of this space to be utilized for additional copper without increasing the stress on the rotor teeth between the slots would allow an increase in the efficiency and capability of the generator.

Accordingly, one object of the present invention is to provide an improved rotor coil support construction which permits better space utilization of the rotor slot.

Another object is to provide a simplified and lightweight coil support means which minimizes the "dead load" carried at the periphery of the rotor.

Another object is to provide an improved coil retainer construction for more effectively introducing coolant to the windings for direct-cooling of the conductors.

Still another object is to allow for assembly of the coil support means at various locations along the length of the rotor without the necessity for driving the support axially for a substantial distance with the attendant possibility of damaging the insulation.

Another object is to reduce stress concentration in the rotor winding support means by eliminating the holes otherwise required for cooling air where they are likely to cause stress concentrations conducive to failure.

Other objects and advantages will become apparent from the following description taken in connection with the accompanying drawings, in which:

FIG. 1 is a cross-section taken transversely through a portion of the body of a generator rotor showing the disposition of the windings in the slots and a preferred rotor coil support system in accordance with the invention;

FIG. 2 is a perspective view showing the method of assembly of the support system depicted in FIG. 1;

FIG. 3 illustrates a modification of the anchor for the rotor coil support; and

FIG. 4 illustrates yet another modification of the anchor.

Generally stated, the invention is practiced by providing a plurality of tension straps curving from one side of the slot to the other and having end portions anchored in adjacent rotor teeth. A contoured filler block is provided to distribute the outward force exerted by the windings on the tension strap so that the centrifugal load is carried by the strap in tension. The filler block may also be provided with ports intermediate the tension straps for introducing or discharging cooling gas to the conductors.

Referring now to FIG. 1 of the drawing, a winding 1 is disposed in slots 2 cut in a rotor body 3 and the winding is separated from the slot by ground insulation 4. Separating the slots 2 are rotor teeth 5 which remain after slots 2 are cut in the rotor 3 and which extend longitudinally along the rotor body. The winding 1 is furnished with cooling conduits 1a, the disposition of which is not material to the present invention. Cooling conduits 1a constitute circuitout paths through the conductors themselves so that a cooling gas passed through the conduits 1a will bring about "direct cooling" of the conductors.

The rotor coil support system, which is the subject of this invention, utilizes a tension member 6 which is depicted as a strap member having enlarged root portions 7. Each root portion 7 is flat on one side 7a so as to cooperate with a mating root portion on the adjacent strap 8 and is provided with hooks 7b which are molded or cut to correspond with the sides of dovetail slots 5a in the rotor teeth 5. Reference to FIG. 1 will illustrate how the root portions 7 mate with the root portions of the adjacent tension members to prevent radial disengagement of the tension members from the rotor teeth 5.

Tension member 6 is preferably forged from high strength alloy steel so as to be as strong as possible while keeping its thickness to a minimum. Since the load is in pure tension on a thin strap, the total stress can be much higher than generally found in slot wedge loading where a combined shear and bending stress exists. For example, the wedge stresses in bending are now limited to the neighborhood of 27,000 p.s.i. On the other hand, the stress in a thin forged strap in tension may be on the order of 70,000 p.s.i. without danger. Also, since the strap 6 is relatively thin, it may be either of magnetic or non-magnetic steel, since the flux loss will be negligible.

Disposed between the windings 1 and tension member 6 is a contoured "filler piece" or compression block 11. Compression block 11 has a curved upper surface 11a which is roughly semi-circular in shape, but could also be parabolic or shaped like a catenary, in order to uniformly distribute the load on tension member 6. The lower surface 11b of block 11 is flat and extends along the top conductor strand 1b of the winding 1. It will be appreciated that centrifugal force exerted on the windings 1 will be transferred to the flat bottom surface 11b and will be re-transferred to the tension member 6 through the curved surface 11a, filler block 11 being loaded in compression.

Since filler block 11 receives a load only in compression, it may be conveniently made of materials which would not be suitable if the block were subjected to bending or tension or shear stresses. Specifically, block 11 may be of molded polyester resin and glass fiber or some suitable plastic laminate, of which there are many types commercially available. Block 11 could also be cast from a ferrous or non-ferrous metal, but in order to keep the magnetic leakage flux to suitable levers, it is preferably of non-magnetic material.

Blocks 11 may also define cooling ports 11c which are so arranged as to empty into or receive a coolant discharged from winding conduits 1a. In this manner, cooling gas can be introduced to the windings through the support block 11 by utilizing the "gap pick-up" method as more fully described in U.S. Patent No. 2,702,870 issued to Rollin H. Norris on February 22, 1955, and assigned to the assignee of the present application.

Reference to FIG. 2 will illustrate how the openings to cooling conduits 11c are disposed so as to lie between adjacent tension members 6 and how the tension members 6 are spaced along the rotor body 3. At spaced points along the rotor teeth 5, dovetail grooves 5a are enlarged to form a notch 12 which will allow radial insertion of the enlarged root portion 7 of tension member 6. In the embodiment shown in FIG. 2, notches 12 are provided for every two tension members 6, although this spacing is purely a matter of convenience and may be so selected as to have any convenient number of tension members 6 between notches. As shown here, notches 12 are axially spaced to accommodate two straps 6, with an additional axial space 13 in which the upper surface 11a of the support block 11 is exposed. The openings to cooling conduits 11c are, of course, arranged so as to fall in this exposed portion of support block 11. Thus it is unnecessary to pierce or otherwise provide openings through the tension members 6 which would give rise to stress concentration which, in turn, would reduce the allowable load for tension members 6.

FIG. 3 shows a modification of the anchor arrangement in which the tension member 6 is provided with a root member 14 shaped in the form of a complete "fir tree." Insertion may be had through radial notches similar to notch 12 in FIG. 2. It will be appreciated that the full enlargement or "fir tree" 14 provides a stronger anchor for a given linear distance along the rotor axis than the anchor 7 shown in FIGS. 1 and 2. This advantage is offset, however, by the fact that the the straps must be alternated in direction as shown in the drawing and the anchor 14 must be moved a greater axial distance from the insertion notch 12 to its final position, therefore making it more difficult to assemble. However, since the highest stress concentrations may occur in the "fir tree" dovetails under some conditions, the modification of FIG. 3 increases the factor of safety in these critical locations.

Yet another modification of the anchor member may be seen by reference to FIG. 4. Here, the two opposite tension members 6 are anchored by roots 15. The circumferential thickness of the root 15 is such that when one tension member is in place in the groove, the other root 15 may be inserted radially and hooked on the dovetail slots in a manner which will be obvious from the drawing. Thereafter, a key member 16 comprised of a radial distance piece 16a and an integral enlarged root 16b is driven axially between members 15. Key 16 need only be strong enough to carry the centrifugal load due to its own weight, since it acts primarily as a spacer member to keep the roots 15 separated so they will not become disengaged from the slot.

The method of operation of my improved rotor coil support system will now be described. After the windings 1 have been placed in the slots, compression blocks 11 are placed over the windings and the cooling conduits 11c are aligned with the winding cooling conduits 1a. Thereafter, tension members 6 are assembled and the root portions 7 are inserted radially through slots 12 and then driven axially, the hooks 9 gripping the mating grooves 5a in rotor teeth 5. It may be necessary to apply some radial force inwardly on support block 11, to maintain the windings and the insulation compressed while tension members 6 are being driven axially over the compression blocks 11. This can be done by applying a radial force at one end of the compression block while tension member 6 is being driven over the other end.

After all of the compression blocks 11 and tension members 6 have been assembled, it will be seen that an outward force exerted by windings 1 will be imposed on the flat surface 11a of compression block 11. This force, in turn, will be transferred to the inner surface of tension member 6 and will tend to stretch the tension member along its length. This tensile force will be communicated to the root portions 7 which will then transfer the radially outward force exerted by the windings 1 to the rotor teeth 5. Members 6 may be made much lighter than a conventional slot wedge. This is because the total stress imposed on the tension member 6 is substantially in pure tension allowing the use of thin forged straps with properties permitting higher imposed stress in the oriented direction.

Moreover, by allowing the coil retaining means to extend outwardly beyond the rotor periphery in an arch, the space below is left free for additional copper, which consequently permits an increase in capacity of the dynamo-electric machine. Likewise, molded plastic or cast metal support blocks may be used, which will consequently allow appropriately contoured coolant passageways to be easily incorporated therein for efficient cooling.

In conclusion, therefore, it is seen tha the principal load-carrying member, tension strap 6, is arranged so that it carries the centrifugal load imposed by windings 1 primarily in tension. As will be appreciated by those skilled in the art, the stress can thus be accurately ascertained, and in general, will require a smaller volume of elastically-stressed metal to support the load than if the coils were supported on conventional, beam-type slot wedges. Since these wedges contribute substantially to the centrifugal stresses at the base of the rotor teeth and in the rotor body, it is evident that, by using a lightweight tension-type member, the latter stresses are not significantly increased even when the space which is saved is filled with active conductor material. Moreover, the provision of separated tension members to carry the load and filler pieces to distribute the load allows for spacing of the tension members so as to easily incorporate coolant passages in the filler pieces. Thus it is unnecessary to provide holes in the load-carrying tension members which would weaken them.

The concept of arching a tension member outwardly from the slots also allows for greater utilization of the effective slot cross-section area, since the windings 1 can extend all the way to the top of slots 2. The windings can even extend beyond the tops of the slots if the filler block 11 is appropriately shaped with a recess in the bottom surface 11b. This represents a distinct improvement over the concept of wedges or other winding retaining means embedded in the slot which waste a large portion of the slot cross-section area and which, due to the manner of attachment, receive greater stress than if the load were carried purely in tension as with this improved design.

It will be apparent that the support block 11, the tension member 6, and the root anchoring means may take many forms without departing from the spirit and scope of this invention. For example, tension members 6, although they are shown here as straps, could consist of flexible wire. Likewise, they also can be of a non-ferrous or non-metallic material provided it has sufficient tensile strength.

Various types of keys or pins may be used to retain the enlarged anchors in the rotor teeth in the manner of FIG. 4. In special circumstances it may also be desirable to span more than one rotor slot with the tension means.

Likewise, the rotor filler blocks 11 may either be in short lengths or may etxend the full rotor length. In fact, the top conductor 1b in the slot, if properly rounded and insulated, can substitute for the filler block 11.

These and many other modifications will occur to those skilled in the art. It is intended to cover in the appended claims all such modifications as fall within the scope of this invention.

What I claim as new and desire to secure by Letters Patent of the United States is:

1. In a dynamoelectric machine rotor comprising a core defining a plurality of longitudinally extending radial rotor slots separated by rotor teeth, the combination of means for retaining the electrical windings in said slots comprising a tension member having an intermediate portion of substantially greater length than the slot width spanning a rotor slot and arched outwardly in a continuous arc to receive the centrifugal load substantially in tension and enlarged end portions disposed in said rotor teeth forming anchor means for securing the opposite ends of the tension member against radial disengagement, and a mating contoured member disposed beneath said tension member for distributing the centrifugal load on the tension member.

2. In a dynamoelectric machine rotor comprising a core member defining a plurality of longitudinally extending slots with tooth portions formed by adjacent slots and conductors disposed in each of said slots, the combination of means for retaining the conductors in the slots comprising a plurality of tension strap members, each being of a length substantially greater than the circumferential distance between adjacent tooth portions and arched outwardly in a continuous arc so as to support the centrifugal forces on the conductors substantially in tension, each strap member having at either end thereof an anchor portion engaging a mating socket portion formed in the adjacent tooth portion of the rotor, and a mating contoured compression member disposed beneath the strap members for distributing the conductor load on the strap members.

3. For use in a dynamoelectric machine rotor defining alternate longitudinally extending radially directed rotor slots and rotor teeth and having windings disposed in said rotor slots, winding suport means comprising a tension member of a length substantially greater than the width of the rotor slots and adapted to be installed in the rotor with its intermediate portion curved outwardly in a continuous arc and spanning a rotor slot, each end of the tension member having anchor means for securing it to an adjacent rotor tooth, and a mating contoured member disposed beneath said tension member for distributing the centrifugal load on the tension member, whereby centrifugal force exerted by the windings will be supported substantially in tension by the tension member and transferred by said anchor means to the adjacent rotor teeth.

4. In a dynamoelectric machine rotor including radially directed longitudinally extending rotor slots separated by rotor teeth defining longitudinal dovetail slots and having electrical windings disposed in the slots, the combination of winding support means comprising a tension member having an intermediate portion spanning the slot and curving outwardly through an arc on the order of 180 degrees and end portions forming anchor means shaped to be secured in said longitudinal dovetail slots, and compression block means disposed between the tension member and the windings to distribute the centrifugal force exerted by the windings, whereby the tension member supports the windings primarily in tension.

5. In a dynamoelectric machine rotor including a body member defining radially directed longitudinally extending winding slots separated by longitudinally extending rotor teeth defining dovetail grooves extending parallel to the slots, with a plurality of electrical conductors disposed in said winding slots, the combination of conductor retaining means including a contoured compression block disposed in abutting relation with the outermost conductors in each slot and having a first arcuate surface extending beyond the periphery of the rotor and a second substantially flat inner surface disposed toward the conductors in the slot, said first arcuate surface terminating at the opposite sides of the winding slot, and tension means retaining the windings against radial movement and including an intermediate strap portion disposed over said first arcuate surface of the compression block and enlarged end anchor portions disposed in said dovetail grooves in the adjacent teeth, whereby the centrifugal force exerted by the windings is transmitted by the compression block and supported by the strap member primarily in tension.

6. The combination in accordance with claim 5 wherein each of said enlarged end anchor portions of said tension means occupies only half of the cross-sectional area of said dovetail grooves, whereby the anchor portions of circumferentially adjacent tension means mutually prevent radial disengagement.

7. The combination in accordance with claim 5 wherein each of said enlarged end anchor portions of said tension means occupies substantially the entire cross-sectional area of said dovetail groove, whereby the tension means alternate longitudinally along the rotor to retain the electrical conductors in circumferentially adjacent winding slots.

8. The combination in accordance with claim 5 wherein each of said enlarged end anchor portions of said tension means is sufficiently small in its circumferential dimension so as to be radially inserted into said dovetail slot while the tension means serving the adjacent winding slot has its end anchor portion disposed in said dovetail slot, and spacer means adapted to be axially inserted between the enlarged end anchor portions of adjacent tension means to prevent the radial disengagement of said end anchor portions.

9. In a dynamoelectric machine rotor including a body member defining radially directed longitudinally extending winding slots separated by longitudinally extending rotor teeth defining dovetail grooves extending parallel to the slots and including a plurality of electrical conductors defining internal cooling conduits opening toward the rotor periphery disposed in said winding slots, the combination of conductor retaining means including a contoured compression block disposed in abutting relation with the outermost conductors in each slot and having a first arcuate surface extending beyond the periphery of the rotor body and a second substantially flat inner surface disposed toward the conductors in the slot and defining internal passages extending between the flat inner surface and the arcuate surface so disposed as to register with the openings of the cooling conduits defined by said electrical conductors, said first arcuate surface terminating at the opposite sides of the winding slot, and a plurality of longitudinally spaced tension members retaining the windings against radial movement each including an intermediate strap portion disposed over said first arcuate surface of the compression block so as not to block the openings to the internal passages of the compression block and enlarged end anchor portions disposed in said dovetail grooves in the adjacent teeth, whereby the conductors may be supplied with coolant from the rotor periphery through said compression blocks without the need for holes in said tension members.

References Cited in the file of this patent

UNITED STATES PATENTS

| Number | Name | Date |
|---|---|---|
| 984,182 | Barr | Feb. 14, 1911 |

FOREIGN PATENTS

| Number | Country | Date |
|---|---|---|
| 23,868 | Great Britain | of 1914 |
| 888,580 | Germany | Sept. 3, 1953 |